United States Patent [19]

Alexander

[11] 3,725,604

[45] Apr. 3, 1973

[54] SIGNAL DETECTING APPARATUS FOR USE IN SOUND TRACK RERECORDING

[76] Inventor: Ronald Crawford Alexander, 4063 Northcliffe Avenue, Toronto, Ontario, Canada

[22] Filed: Sept. 17, 1971

[21] Appl. No.: 181,470

Related U.S. Application Data

[63] Continuation of Ser. No. 820,397, April 30, 1969.

[52] U.S. Cl. ....................179/100.1 VC

[51] Int. Cl. ....................G11b 27/22, G11b 27/36

[58] Field of Search ..........179/100.1 R, 100.1 VC, 179/100.2 B, 100.2 K, 100.3 P, 1 VC, 100.4 D

[56] References Cited

UNITED STATES PATENTS

| | | | |
|---|---|---|---|
| 1,647,242 | 11/1927 | Mills | 179/100.1 R |
| 2,077,466 | 4/1937 | Dreyer | 179/100.4 D |
| 2,341,706 | 2/1944 | Fields | 179/100.2 B |
| 2,512,432 | 6/1950 | Kolb | 179/100.2 B |
| 2,759,049 | 8/1956 | Scott | 179/100.4 D |
| 2,797,264 | 6/1957 | Blaney | 179/100.2 B |
| 3,321,581 | 5/1967 | Zryd | 179/1 VC |

*Primary Examiner*—Raymond F. Cardillo, Jr.
*Attorney*—Alan Swabey

[57] ABSTRACT

A signal detecting apparatus for use in sound track rerecording comprising a magnetic storage tape having voice frequency signals transcribed thereon. A first magnetic pickup head is adapted to sense the presence or absence of the voice frequency signals on the magnetic tape. A synchronizing circuit is connected to said first pickup head and to a visual indicator. A second magnetic pickup head is associated with the magnetic tape. The synchronizing circuit is operable by the presence of voice frequency signals at the first magnetic pickup head for producing signals indicative of the exact beginnings and ends of the voice frequency signals and any pauses the voice frequency signals being sensed by the second magnetic pickup head.

6 Claims, 3 Drawing Figures

SIGNAL DETECTING APPARATUS FOR USE IN SOUND TRACK RERECORDING

CROSS-REFERENCE TO RELATED APPLICATION

This application is a continuing application of copending application, Ser. No. 820,397, filed Apr. 30, 1969, and having the same inventor.

BACKGROUND OF THE INVENTION

1. Field of Invention

This invention relates to a signal detecting apparatus for use in sound track rerecording in motion picture technology.

2. Description of Prior Art

In motion picture technology, the term "rerecording"refers to the process whereby all the elements which make up the sound track of a motion picture—music, dialogue, narration and sound effects are combined and recorded on to one or more tracks in synchronization with the motion picture. In the case of a monaural sound track, all of the elements are recorded on to one track, usually on a magnetic tape, which is then transferred to optical negative sound which in turn is married to the picture in a printing process which produces the "married" or composite motion picture with the picture and sound track on one piece of film. Alternatively, the "mixed" sound track can be transferred to a band of magnetic tape on the picture print or, in the case of multi-track films on to several separate magnetic bands (or stripes, as they are called) on the picture print.

The term "rerecording" probably stems from the fact that usually, all of the elements which are combined to make the sound track have been recorded previously. For example, the music has been recorded prior to the rerecording process as have the sound effects and dialogue.

These original sound tracks are played back on machines called rerecorders and fed separately to a rerecording console where they are mixed together in proper balance by a rerecording mixer (human) and recorded on to the track or tracks which will become the sound track for the finished motion picture. The original rerecording tracks may be either optical or magnetic but usually are the latter.

In assembling the tracks for rerecording, the editor makes a note of the footage at which each of the various elements occur in the film and these footages are submitted to the rerecording mixer in the form of a cue sheet along with a description of what is on each track.

In the rerecording studio a footage counter is run in synchronization with the picture and the sound tracks. The rerecording mixer uses this counter as a guide in combining the various elements of the sound track. In this example, the narration is important and all of the other elements must be worked around it so as not to interfere with intelligibility.

SUMMARY OF INVENTION

The present invention provides a signal detecting apparatus for use in sound track rerecording for sensing the beginnings, pauses and ends of recorded blocks of voices and visually displaying these conditions. This device eliminates the need for narration or dialogue cues and in a simple, direct manner provides the rerecording mixer with a precise indication of the beginnings, pauses and ends of narration or dialogue thus enabling the rerecording mixer to do a smoother, more positive "mix" of the sound tracks than he could with conventional cues.

It is thus the main object of the present invention to provide a signal detecting apparatus for sensing beginnings, pauses and stoppages in sound and providing a signal that may be used manually or automatically for mixing or blending the sound with other effects such as background music.

Broadly, the present invention relates to a signal detecting apparatus for use in sound track rerecording comprising a magnetic storage means having voice frequency signals transcribed thereon. A first magnetic sensing means is adapted to sense the presence or absence of the voice frequency signals on the magnetic storage means. Circuit means is connected to the first magnetic sensing means and to a visual indicator. A second magnetic sensing means is also associated for sensing the voice frequency signals a predetermined time after they have been sensed by the first magnetic sensing means. The circuit means is operable by the presence of voice frequency signals at the first magnetic sensing means and cause the visual indicator to indicate the exact beginnings and ends of the voice frequency signals being sensed by the second magnetic sensing means and further indicates the approach of beginnings, pauses and ends of the voice frequency signals at the second magnetic sensing means.

BRIEF DESCRIPTION OF THE DRAWINGS

Further features, objects and advantages will be evident from the following detailed description of a preferred embodiment of the present invention taken in conjunction with the accompanying drawings in which.

DESCRIPTION OF PREFERRED EMBODIMENTS

Figure 1:
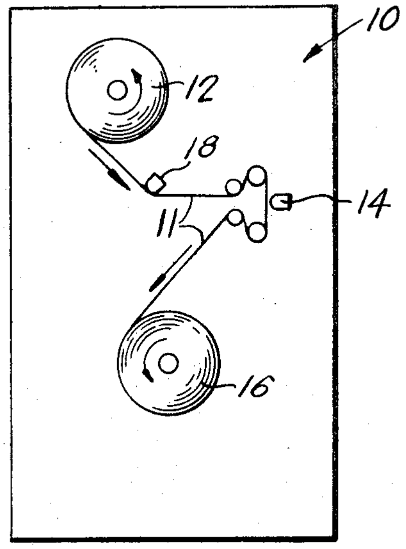
FIG. 1 is a plan view illustrating the relative location of the prescanner of presensing means.

As shown in FIG. 1, the rerecording apparatus 10 is adapted to receive a magnetic tape 11 stored on a feed reel 12 and passing for contact with a pickup head 14, and then wound on a takeup reel 16. A prescan pickup head 18 is also provided on the rerecorder 10 and located a precise distance ahead of the pickup head 14 in contact with the surface of the tape to sense the voice signals on the tape a predetermined time before these voice signals reach the pickup head 14.

Figure 2:
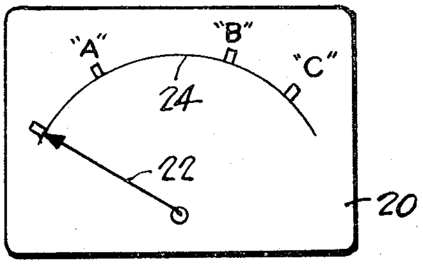
FIG. 2 is a first view of a metering device for use with the present invention.

The prescan pickup head 18 provides a signal which is used to actuate suitable timing and control circuits (to be described hereinbelow) which operate a meter 20, or the like, which in the illustrated arrangement (FIG. 2) has a pointer 22 on the scale 24 marked with three key positions A, B, and C.

Figure 3:
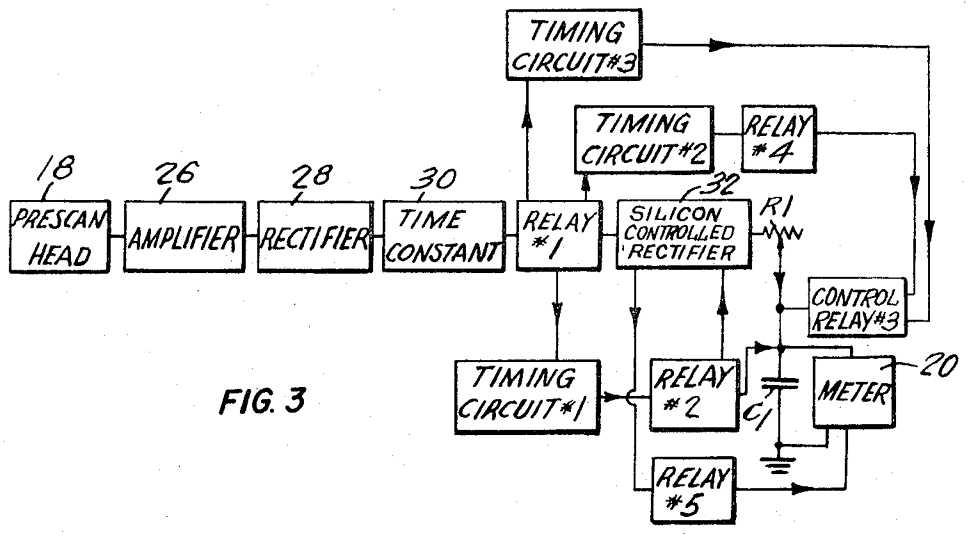
FIG. 3 is a schematic block diagram illustrating one arrangement suitable for carrying out the present invention.

As can be seen from FIG. 3, the prescan pickup head 18 is connected to an amplifier 26, a rectifier 28 and a time constant circuit 30. The time constant circuit 30 is designed to ensure that relay No. 1 will remain closed during sustained passages of voice signals.

When relay No. 1 is closed, it provides the necessary current to actuate a silicon controlled rectifier 32 through a suitable circuitry that maintains the rectifier 32 activated until deactivated by the action of relay No. 2 under control of timing circuit 1. The silicon controlled rectifier 32 is connected to capacitor $C_1$ through variable resistor $R_1$ and control relay No. 3 and charges the capacitor $C_1$ which is connected in parallel with the meter 20.

The current from the silicon controlled rectifier 32 operates a relay No. 5 which turns on the internal light in the meter 20.

The relay No. 1, when closed, also actuates timing circuits 1, 2 and 3. The timing circuit 3 actuates relay No. 3 in response to the opening of relay No. 1 and allows capacitor $C_1$ to discharge through the meter 20 at a predetermined rate. The timing circuit No. 2 operates relay No. 4 to adjust control relay No. 3 in a manner to be described hereinbelow. Timing circuit No. 1 operates relay No. 2 which renders the silicon controlled rectifier 32 non-conducting and permit the control relay No. 3 to discharge the capacitor $C_1$ more rapidly.

The operation of the rerecorder is as follows:

A prescan pickup head 18 is mounted on the rerecorder on which a magnetic tape 11 containing stored blocks of narration or dialogue is running. This prescan head 18 picks up the signal on the magnetic tape 11 before the regular pickup head 14.

When the beginning of a signal is sensed at the prescan head 18, a predetermined time before the same signal reaches the regular pickup head 14, it turns on a light in the meter 20 which is normally mounted in the front panel of the rerecorder 10.

As capacitor $C_1$ charges, the pointer starts moving smoothly up the scale 24 towards point "B" on the meter scale. Its rate of climb is such that at the precise moment when the pointer reaches point "B" the beginning of the voice track reaches the regular pickup head 14 on the rerecorder.

The pointer 22 continues past point "B" and comes to rest at point "C" and remains there until there is a substantial pause in the voice track at which time the pointer starts dipping down toward point "A" and if the voice signal returns it starts climbing again to position "C". Note that the internal light of the meter has stayed on during this time. When the end of a block of voice signal is approaching, the pointer swings smoothly down to point "A", arriving there at the precise moment at which the end of that block of the voice track has just passed the regular pickup head 14 on the rerecorder 10 (see FIG. 3). When the pointer 22 reaches point "A", the internal light of the meter goes "off" and the pointer 22 drops quickly to its normal "no signal" position and stays there, with the light "off" until the next block of voice comes along on the voice track at which time the indications are repeated.

The above meter indications result from the following circuit operation. The voice signal from prescan head 18 is amplified, rectified and causes relay No. 1 to close and remain closed as long as sustained passages of voice signals continue at the prescan head 18.

When relay No. 1 closes, it supplies the necessary current to fire a silicon controlled rectifier 32 which provides current for charging capacitor $C_1$ in parallel with the meter 20. The silicon controlled rectifier 32 also operates relay No. 5 which turns on the internal lights (not shown) in the meter 20. As capacitor $C_1$ charges, the meter pointer 22 climbs up the scale 24. Resistor $R_1$ is used to adjust the rate of charge of capacitor $C_1$ so that the meter pointer 22 reaches point "B" at the precise moment that the beginning of the voice signal reaches the regular pickup head 14 on the rerecorder 10.

When a signal pause of a predetermined length occurs in the voice track, relay No. 1 is de-energized and opens, causing activation of the unijunction timing circuits No. 1 and No. 3. Timing circuit No. 3 operates faster than timing circuit No. 1 causing relay No. 3 to activate and disconnecting the meter 20 and capacitor $C_1$ from the current provided by the silicon controlled rectifier 32. Capacitor $C_1$ discharges through the meter 20 and the pointer 22 starts down the scale towards point "A". If the pause is a short one, with the next voice signal a short distance behind, relay No. 1 closes again this time operating timing circuit No. 2 (because circuit No. 2 is fed through relay No. 1 from the current provided by the silicon controlled rectifier). Timing circuit No. 2 is quite fast and operates relay No. 4 to unlock relay No. 3 and reconnect capacitor $C_1$ and the meter 20 to the current of the silicon controlled rectifier 32. Capacitor $C_1$ charges up again and the meter pointer 22 moves back up to point "C" on the meter scale 24.

As the definite end of a block of voice signal leaves the prescan head 18, relay No. 1 opens, activating timing circuits No. 1 and No 3.

Circuit No. 3 operates relay No. 3 which separates capacitor $C_1$ and the meter capacitor 20 from the silicon controlled rectifier's current supply. $C_1$ starts to discharge through the meter 20 and the pointer 22 starts down the scale 24 towards point "A".

At the same time, timing circuit No. 1, which is set to operate the relay No. 2 at the same time as the break in the voice train reaches the regular playback head, is operating. At this precise time, relay No. 2 is activated to cut off the current from the silicon controlled rectifier 32 and at the same time short out capacitor $C_1$ so that it finishes discharging very quickly and the meter pointer 22 quickly returns to its "no signal" position. As the current from the silicon controlled rectifier 32 is cut off, relay No. 5 opens to turn off the internal lights in the meter 20. Timing circuit No. 2 is adjusted so that the meter pointer reaches point "A" just at the time when relay No. 2 cuts off the current from the silicon controlled rectifier and shorts out capacitor $C_1$.

The device of the invention does away with the need for providing footage cues for the beginning and end of blocks of narration or dialogue. It provides accurate, positive indications of beginnings, pauses and ends of voice signals from the voice track itself so that no special preparation of the voice track is required and any changes in position of the voice in the track do not affect the operation of the device.

Typical applications of the apparatus herein disclosed are:

1. For a form of automated rerecording, the automatic control 34 may be used to control a variable gain device which would automatically reduce the level of the music and sound effects track when voice enters and restore them to their normal level once the voice was finished. In a preferred arrangement, a sensing device could be employed which would sample the power in the music and effects tracks to decide whether their level had to be reduced for voice and if so by how much.

2. For a form of noise suppression, the automatic control 34 could be used with a variable gain element to control the output from the regular pickup head of the rerecorder on which the voice track is running so that in the absence of voice, the system noise or ambient sound on the voice track could be reduced by any desired amount. When the voice signal actually reaches the regular pickup head, the output would be restored to its normal level.

The circuit described above uses a combination of solid state devices and electrical-mechanical relays. The circuit can be modified to utilize all solid-state components or other switching devices for example reed relays.

In the circuit shown, a meter is used for the visual presentation of information concerning the voice track. Other indicators could be used for example a "magic-eye" tube or oscillograph-type device. Timing circuits. 1, 2 and 3 shown in FIG. 3 are of the type described on page 198 of the "General Electric Transistor Manual" sixth edition. Relays 1, 2, 3, 4 and 5 shown in FIG. 3 are standard electromechanical d.c. operated relays.

I claim:

1. A signal detecting apparatus for use in sound track rerecording comprising:

1. magnetic storage means having voice frequency signals transcribed thereon,
2. first magnetic sensing means adapted to sense the presence or absence of said voice frequency signals on said magnetic storage means,
3. circuit means connected to said first magnetic sensing means and to a visual indicating means,
4. second magnetic sensing means associated with said magnetic storage means for sensing said voice frequency signals a predetermined time after they have been sensed by said first magnetic sensing means,
5. said circuit means being operable by the presence of voice frequency signals at said first magnetic sensing means for producing signals indicative of the exact beginnings and ends of said voice frequency signals and any pauses between said voice frequency signals being sensed by said second magnetic sensing means.

2. A signal detecting apparatus as claimed in claim 1 wherein said indicating means is operable in response to said indicating signals for visually indicating the approach of said beginnings and ends of said voice frequency signals and said pauses at said second magnetic sensing means.

3. A signal detecting apparatus as claimed in claim 1, wherein said visual indicator comprises a meter having a scale and a pointer, said scale having a first, second and third indicated position, said pointer being displaced to said second position at the precise instant when a voice frequency signal arrives at said second magnetic sensing means, said pointer being displaced to said third position when said voice frequency signal at said first magnetic sensing means is continuous, and said pointer being displaced to said first position at the instant the end of the voice frequency signal arrives at said second magnetic sensing means.

4. A signal detecting apparatus as claimed in claim 3 wherein said first magnetic sensing means is a magnetic pickup head, said pickup head being connected to said circuit means to cause a capacitor to charge and discharge in accordance with the presence or absence of said voice frequency signals, said capacitor controlling the position of said meter pointer in accordance with its charge.

5. A signal detecting apparatus as claimed in claim 4 wherein said circuit means includes adjustable current means to adjust the rate of charge of said capacitor to synchronize said first and second magnetic sensing means with said voice frequency signal.

6. A signal detecting apparatus as claimed in claim 4 wherein said circuit means further includes a first, second and third timing circuit, said third timing circuit being activated when a pause in said voice frequency signal is detected by said first magnetic pickup head and causing said capacitor to discharge through said meter to displace said pointer on said scale from said third position to said first position, said second timing circuit being activated by said first magnetic pickup head when a voice frequency signal reappears before the full discharge of said capacitor and reconnecting said capacitor to a charging current from a silicon controlled rectifier circuit thereby causing said meter pointer to assume its third position, said first timing circuit being activated at the instance of absence of said voice frequency signal from said second magnetic pickup head to shunt said capacitor to discharge it rapidly thereby causing said meter pointer to return to its inoperative position.

* * * * *